US006941419B2

United States Patent
Haines et al.

(10) Patent No.: US 6,941,419 B2
(45) Date of Patent: Sep. 6, 2005

(54) METHOD AND APPARATUS FOR DISC DRIVE BUFFER SEGMENT MANAGEMENT

(75) Inventors: Jonathan W. Haines, Lafayette, CO (US); William S. Herz, Hayward, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 445 days.

(21) Appl. No.: 09/866,252

(22) Filed: May 24, 2001

(65) Prior Publication Data

US 2002/0124132 A1 Sep. 5, 2002

Related U.S. Application Data

(60) Provisional application No. 60/206,743, filed on May 24, 2000.

(51) Int. Cl.[7] ............................................. G06F 12/00
(52) U.S. Cl. ...................... 711/112; 711/111; 711/167; 710/52; 710/56
(58) Field of Search ........................ 711/111–112, 167; 710/52, 56, 58

(56) References Cited

U.S. PATENT DOCUMENTS

| 5,276,662 A | * | 1/1994 | Shaver et al. ............... 711/4 |
| 5,594,926 A | * | 1/1997 | Chang et al. ............... 710/52 |
| 5,636,188 A | * | 6/1997 | Funahashi .................. 711/4 |
| 5,689,653 A | * | 11/1997 | Karp et al. ................ 712/222 |
| 6,330,640 B1 | * | 12/2001 | Williams et al. ............ 711/112 |

OTHER PUBLICATIONS

Williams, et al., U.S. Appl. No. 09/696,861, filed Oct. 26, 2000 entitled *Vector Buffer Management*.

* cited by examiner

Primary Examiner—T Nguyen

(57) ABSTRACT

Aspects of the invention include a method and apparatus to manage the cache memory of a disc drive. In one aspect the data rates of different file read and write threads are used to determine the minimum seek time to allow the cache to be used more efficiently. In another aspect, the read/write cache segments are adjusted by determining the summation of the ratio between read/write cache segment sizes and the respective data rates and then adjusting the segment sizes to minimize the seek times for the data streams.

19 Claims, 7 Drawing Sheets

METHOD AND APPARATUS FOR DISC DRIVE BUFFER SEGMENT MANAGEMENT

CROSS-REFERENCE TO A RELATED APPLICATION

This invention is based on U.S. Provisional Patent Application Ser. No. 60/206,743 filed May 24, 2000 entitled "Variable buffer segment sizing based on data Rates for Efficient Dynamic Load Balancing" filed in the name of Jonathan W. Haines, and William S. Herz. The priority of this provisional application is hereby claimed.

U.S. patent application entitled "Vector Buffer Management", Ser. No. 09/696,861 filed on Oct. 26, 2000, filed in the name of Steven S. Williams, Brett A. Cook, Gregory P. Moller, and Jonathan Haines is hereby incorporated herein by reference in its entirety.

BACKGROUND OF THE INVENTION

1. Field of the Invention

The invention generally relates to storing and retrieving data on a disc drive.

2. Background of the Related Art

Disc drives are capable of storing large amounts of digital data in a relatively small area. Disc drives store information on one or more recording media. The recording media conventionally takes the form of a circular storage disc, e.g., media, having a plurality of recording tracks. Conventional disc drives include a plurality of vertically aligned storage discs, each with at least one magnetic head for reading or writing information to the media. Typically, the magnetic head is attached to a positioner arm assembly that uses motors, such as voice coil actuators, to align the magnetic head above the disc. The location of the magnetic head is typically determined by a disc controller that is given the position of a data area on the disc to read or write data. The precise location and movement of the head is typically accomplished by incorporating a closed-loop electromechanical servo system with a dedicated servo region, or regions, used to provide feedback to the system to maintain accurate positioning of the data head(s).

Generally, data is stored on the media in data sectors within each recording track, i.e., cylinder. The media's capability to store data reliably is a function of the surface area used to store a magnetic flux transition, i.e., the data density. To maintain an approximate constant data density the number of data sectors per each cylinder on the outer portion of the media is greater than the number of sectors found on cylinders located closer to the center portion of the media. Therefore, to keep the density of magnetic transitions per unit area approximately constant for a generally round media, there in usually more data per track i.e., cylinder, at the outer portion of the media than at the inner portion of the media.

Due to their large storage capacity relative to other forms of electronic digital data storage, disc drives are often used by electronic systems such as computers to permanently or semi-permanently store applications, e.g., software programs, data, etc. The amount of data stored on disc drives is a function of the media density, size, and number of medias used. The applications are generally stored as files that are then used by an end user, or users, to perform tasks such as word processing, calculations, and the like. To assist the applications in locating a file, conventional computer operating systems generally use a layered directory structure. The conventional layered directory structures usually have a main directory and then sub directories where the files are stored. For example, using the DOS operating system, a file named "xyz" may be given a logical location such as "c:/xyz" indicating that the file is located on the "c" drive at the root directory "/".

To allow an application to find and use files on the media, each file is given a different logical location on the media by the computer operating system. Operating systems communicate with the disc drive using logical block addresses (LBA). When an application makes a request for a file from the operating system, the operating system uses the file name to look up the location in terms of a starting LBA and the number of LBAs needed to read or write the file. The LBA is then translated by internal disc drive software to the actual physical location on the disc drive, i.e., the physical block address (PBA). The translation from LBA to PBA is necessary to allow the disc drive to implement a defect management scheme and to set aside reserved areas on the media for manufacturer specific data not generally accessible to the operating system such as disc drive operating firmware, etc.

As the drive read and writes data to the media, the positioner arm moves the head(s) to different media locations related to each application. The time needed to access and/or store data on the media is known as the "seek time" and is generally a function of the closed loop electromechanical servo system to move the head(s) from one cylinder to another, plus a media rotational delay component due to the fact that once a head arrives over a desired cylinder, the media must rotate until the head is above the desired data sector. The faster the head is moved and finds the location the better the drive performance. Unfortunately, improving the speed of head movement on conventional drives having a limited mechanical capacity for movement requires upgrading the positioner and voice coil circuitry to increase the seek speed of the head(s) thereby adding cost to the disc drive.

To help alleviate seek time issues and as the host computer system is generally much faster than the read process of the disc drive, buffer memory (e.g., cache memory) is used to store data in advance to allow the head time to move to the next file location. In operation, the buffer, e.g., cache memory is checked to see if the requested data is already available, thus avoiding a disc read. If the data is in the cache, then the application uses the data, however, if the data is not available then the positioner arm must move the read/write head(s) to the proper location and read the data into the buffer that is then used by the application. The host computer, working in conjunction with the disc drive buffer controller, provides precise control over the buffer in the transfer of files into segments of the buffer memory. Conventionally, counters and interrupts are used to "watch over" the transfer of the data into and out of the buffer servicing commands form the host computer. The counters, which are typically located within the host and disc control system, count the number of transfers that occur between both the host and the buffer and the disc and the buffer. Based upon the number of transfers, an interrupt generator is employed to supply an interrupt to the disc control system immediately after a pre-determined number of transfers to the buffer have occurred. Depending upon the type of data being written to or retrieved from the media, the head may move either too slowly, allowing the media to "spin a rev", i.e., rotate one or more times without reading data, until the head has located the proper data address, or move too quickly causing the head to be idle or spin without usage, while the buffer memory is purged. In either case, the idle time caused adds to the drive seek time and thus lowers drive performance. To minimize seek time the buffer sizes and access speeds may be increased. However increasing buffer memory performance also generally increases the cost of the disc drive. Further, it may be increasingly difficult to optimize the memory size to accommodate a variety of different applications, file types, sizes, etc.

Generally, related data is written to adjacent areas on the disc as when data is stored to or to be stored at one location it is highly probable that data stored or to be stored at physically adjacent locations will be accessed either in succession or very soon thereafter. The disc control system initiates write operations to transfer the data from the buffer to the media that are generally dependent on the type of file being read, for example, for an audio-video file the write operation may start when there is a sufficient amount of data in the buffer, and for a non-A/V type file when perhaps there is data in the buffer. Conventionally, there are several methods to write the data in an "orderly" fashion, e.g., in queue. One method is to search the buffer for adjacent data blocks, another uses the keeping a "least recently used" (LRU) queue, which includes a list of data blocks in order of access and use. A third method is to simply remove blocks from the buffer on a first-in-first-out basis. While, all three techniques provide an effective means of implementing the storage and retrieval of data files, problems have arisen from data transfers to a disc from buffers having limited space particularly if the data is not being transferred in on a first-in-first-out basis. The problem is further exacerbated by large files such as audio and video files that require large amounts of data to be moved in and out of the buffer.

Ideally, to help the drive in the read/write caching process the host computer would tell the disc drive the amount of time required for each read/write operation pertaining to a particular file. The host generally knows the amount of time for a write operation as it can give a somewhat accurate data transfer rate. Unfortunately, the host computer may not know the actual processing time for the segment of the file, or the actual data rates necessary for multiple interleaved read file operations, e.g., read threads as the host may not know the actual processing time by the hardware. For example, a host may not know the actual decoding rate for a decoder decoding an MPEG audio/visual (A/V) stream. Further, while time indexing of the decoding process is possible it would probably result in an unusual amount of overhead processing time by the host and the disc drive, slowing the response of the overall data transfer. Additionally, "trick modes" such as fast forward play on A/V data require time and size information about the data stream so that the trick mode can be performed with the correct segment sizes allocated in the buffer. Unfortunately, the data rate each stream of data uses may vary dramatically causing the buffer allocation to over compensate, or under compensate the data stream's buffer storage need.

Thus, what is needed is a method that allows for effective and adaptable file storage on a disc drive that optimizes the performance of the disc drive.

SUMMARY OF THE INVENTION

Aspects of the invention have particular advantages in electronic data storage systems. In one embodiment, the invention provides a method of buffer segment management on a disc drive which includes for a read operation, determining if one or more buffer segments comprise the data for a read command, where if the data is available then processing the data, where if the data is not available then determining if a current disc operation time is greater than or equal to one or more read time limits to transfer the data from a media to the one or more read buffer segments. However if the disc operation time is greater than the one or more read time limits then aborting the read command, but if the disc operation time is less than or equal to the one or more read time limits then reading the data. For a write operation, determining if the data storing size of one or more of the current write buffer segments is sufficient to store the data for a write command, If the data storing size is sufficient to store the data then transferring the data, however if the data storing size is not sufficient to store the data then, determining the data sizes of one or more write buffer segments minimizing the number of seek operations within one or more write time limits, where if transferring the data from the one or more write buffer segments is within the one or more write time limits then transferring the data; and wherein, if transferring the data from the one or more write buffer segments is not within the one or more write time limits then aborting the write command.

In another embodiment, the invention provides a method of buffer segment management on a disc drive, for a read operation, establishing the command time limits for reading at least two data streams into a read buffer segment, then determining the data rates for the at least two read data streams to establish the time to read the data streams into the read buffer segment, determining the read buffer segment size for each data stream with respect to each data stream data rate, comparing the time required to read the at least two data streams into the read buffer segment with the time limits wherein if the time required to read the at least two data streams into the read buffer segment exceeds the command time limit then aborting the read, however, if the time required to read the at least two data streams into the read buffer segment does not exceed the command time limit then reading the data. For a write operation, the method performs the steps of determining the data rates for at least two write data streams, then establishing the time limits for transferring data from the write buffer to a media, where if the write buffer space is less than the size required then flushing at least one write buffer segment to provided more write buffer segment space; where after flushing the write buffer segment the space is less than the size required then, determining if the time limits will be exceeded; if the time limits will be exceeded then aborting the write operation, however, if the time limits will not be exceeded then transferring the data to the write buffer segments.

In another embodiment, the invention provides a disc drive system including a signal-bearing media means for storing data, a code memory means coupled to a read/write controller means for controlling the reading and writing of data to the signal-bearing media, means for reading and writing the data to the signal-bearing media, a processor means coupled to the code memory and the read/write controller comprising a program for managing memory segments on the signal-bearing media means.

BRIEF DESCRIPTION OF THE DRAWINGS

So that the manner in which the above recited features, advantages, objects, and aspects of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

DETAILED DESCRIPTION OF THE PREFERRED EMBODIMENT

Aspects of the invention have particular advantages in electronic data storage systems. One exemplary electronic data storage system commonly used in the computer industry, well suited for supporting the buffer segment management method described herein, is known as a disc drive. As will be described below, aspects of the invention pertain to specific method steps implementable on computer disc-drive systems.

In one embodiment, the invention may be implemented as part of a computer program-product for use with computer disc-drive systems. The programs defining the functions of the invention can be provided to the disc drive via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of the present invention, represent alternative embodiments of the invention. It may also be noted that portions of the product program may be developed and implemented independently, but when combined together constitute embodiments of the invention.

Figure 1:
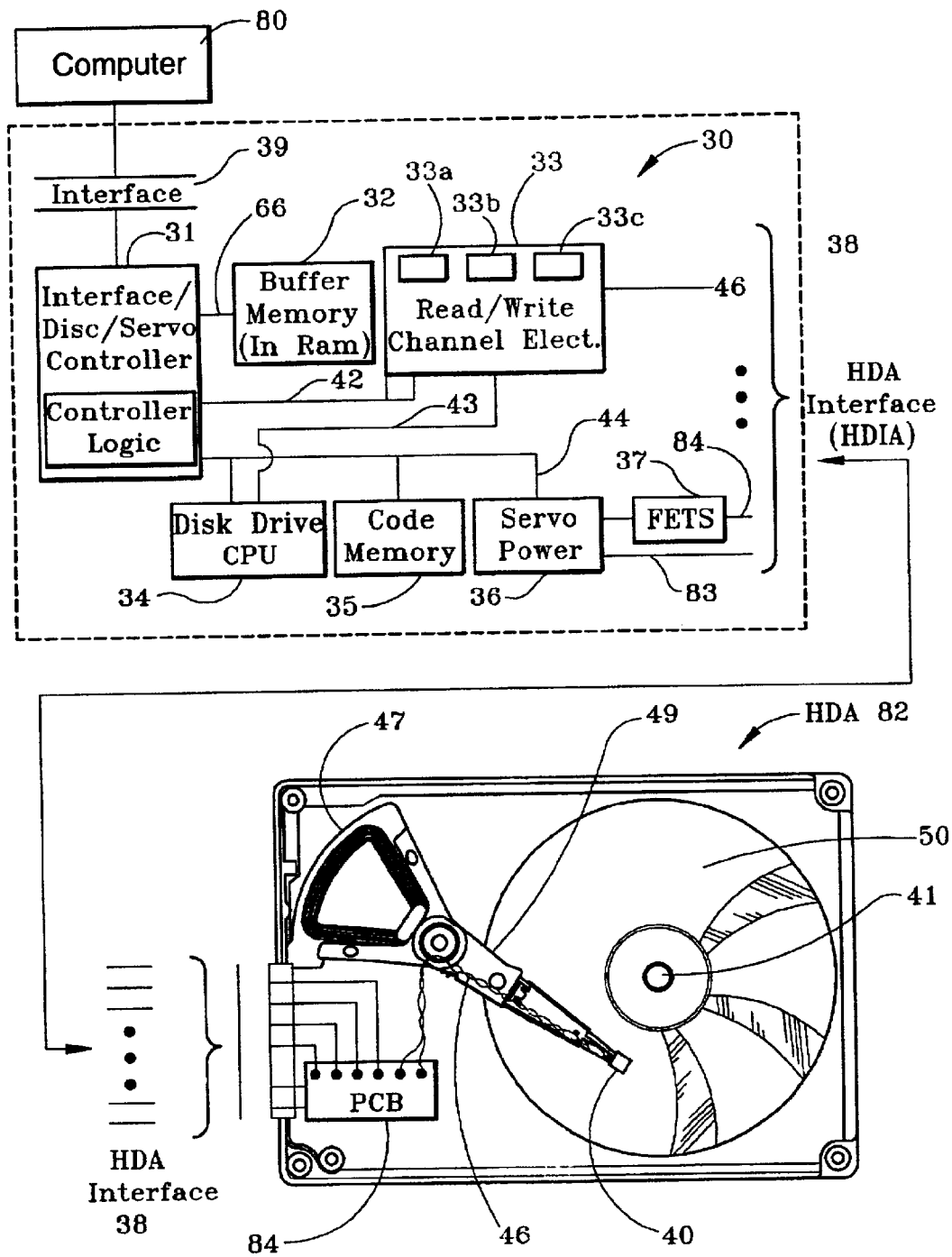
FIG. 1 is a plan view of a conventional disc-based apparatus for reading and writing data on a media wherein aspects of the invention may be used to advantage.

FIG. 1 is a plan view of a typical disc-based apparatus for reading and writing data on a media 50 wherein aspects of the invention may be used to advantage. FIG. 1 illustrates one embodiment of the invention including disc drive electronics 30 which in general includes an interface 39 adapted to receive external signals and data, and a Head Disc Assembly Interface (HDAI) 38 for connecting the disc drive electronics 30 to the head disc assembly (HD) 82. The HD 82 includes read/write transducer head(s) 40 coupled via wires 46 to the HDAI 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above the media 50 to read and write data to the media 50. The media 50 typically includes a disc or discs coated with a recording material such as ferrous iron, magneto-optical media, and other materials adapted to hold a magnetic flux. Media 50 may also include optical media such as a DVD adapted to optically store digital information. A computer 80 of any conventional design includes an operating system adapted to receive digital information communicate with the disc drive electronics 30 through interface 39.

The interface/disc/servo controller 31 provides a translation and command interface between the computer 80 and disc drive electronics 30 through the interface 39. The interface/disc/servo controller 31 is directly connected to the buffer memory 32 through a memory bus connection 66. The buffer memory 32 may store program code and/or data for use with the operation of the drive. Interface/disc/servo controller 31 is also connected via a read/write bus 44 to a CPU 34 used for processing the disc drive commands, a code memory 35 adapted to store operational data and commands, and the servo power electronics 36, adapted to operate the servomotor 41 and actuator arm 49. Servo power electronics 36 are typically connected to the HD 82 via servo control connection PCBA 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 include read write logic 33a, write logic 33b, and servo logic 33c, and includes a connection to the interface/disc/servo controller 31 through the data bus 42 and a connection to the read/write head(s) 40 through read/write line 46. A serial bus 43 is used to send configuration commands from the CPU 34 to the read/write channel electronics 33.

FIG. 1 is merely one hardware configuration for a disc-drive data storage system. Aspects of the invention can apply to any comparable hardware configuration, regardless of whether the disc-drive data storage apparatus is a complicated, multi-media storage apparatus including a plurality of media types, or a single disc-drive data storage apparatus.

Figure 2:
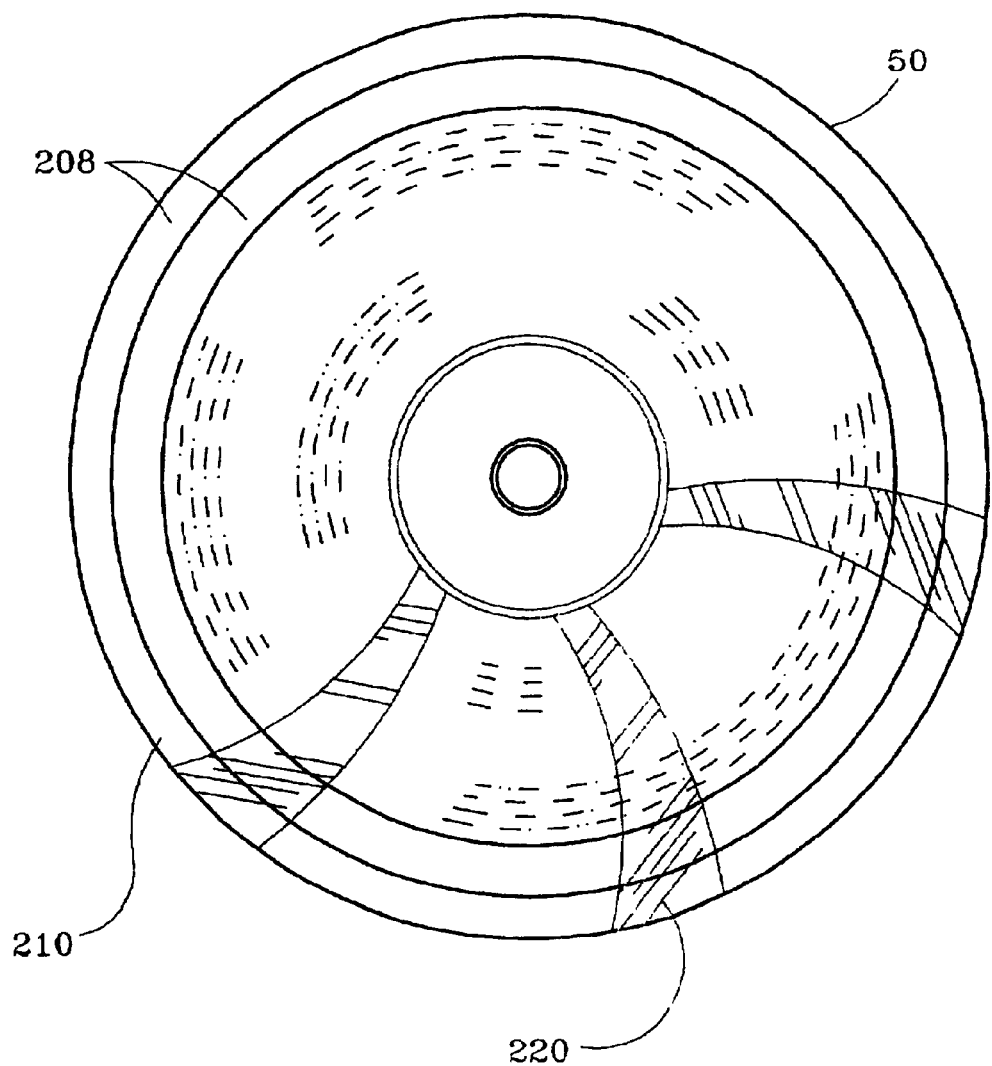
FIG. 2 is a plan view of conventional media for storing data wherein aspects of the invention may be used to advantage.

FIG. 2 is a plan view of the media 50 for storing data wherein the invention may be used to advantage. FIG. 2 illustrates data storage tracks 208 on the media 50 including data wedges 210 separated by a plurality of servo wedges 220 in accordance to the invention. As necessary, FIG. 1 is referenced in the following discussion of FIG. 2. For clarity, only portions of the tracks 208 are shown. Illustratively, a plurality of the tracks 208 are shown representing a plurality of data wedges 210 and servo wedges 220 extending across the media for data storage and retrieval by the read/write head(s) 40. As the read/write head(s) 40 fly over the media 50, the servo actuator 47 moves the actuator arm 49 and read/write head(s) 40 to a particular track 208 on the media 50 in response from commands of the interface/disc/servo controller 31. The data wedges 210 are generally used for storing external data from an external user such as multimedia files and are generally accessible by the user through the interface 39. Several adjacent tracks 208 can be combined together to create a "zone" of tracks 208 with similar data densities. The "zone" may represent several data wedges 210. Servo wedges 220 are portions of each track 208 that may include read/write head(s) alignment indicia, physical address information, and check pointing data used for defect management. Servo wedge data is generally for the drive use and is generally inaccessible to the outside user. The servo wedge 220 includes digital data that identifies the particular track (e.g., cylinder) and the sector. The servo wedge also includes area(s) of precisely placed magnetic bursts where the relative amplitude when read from the read/write head(s) 40, indicates the position of the head relative to the track center. Additional fields may be written into the servo wedge 220 as desired by the manufacturer.

Figure 3:
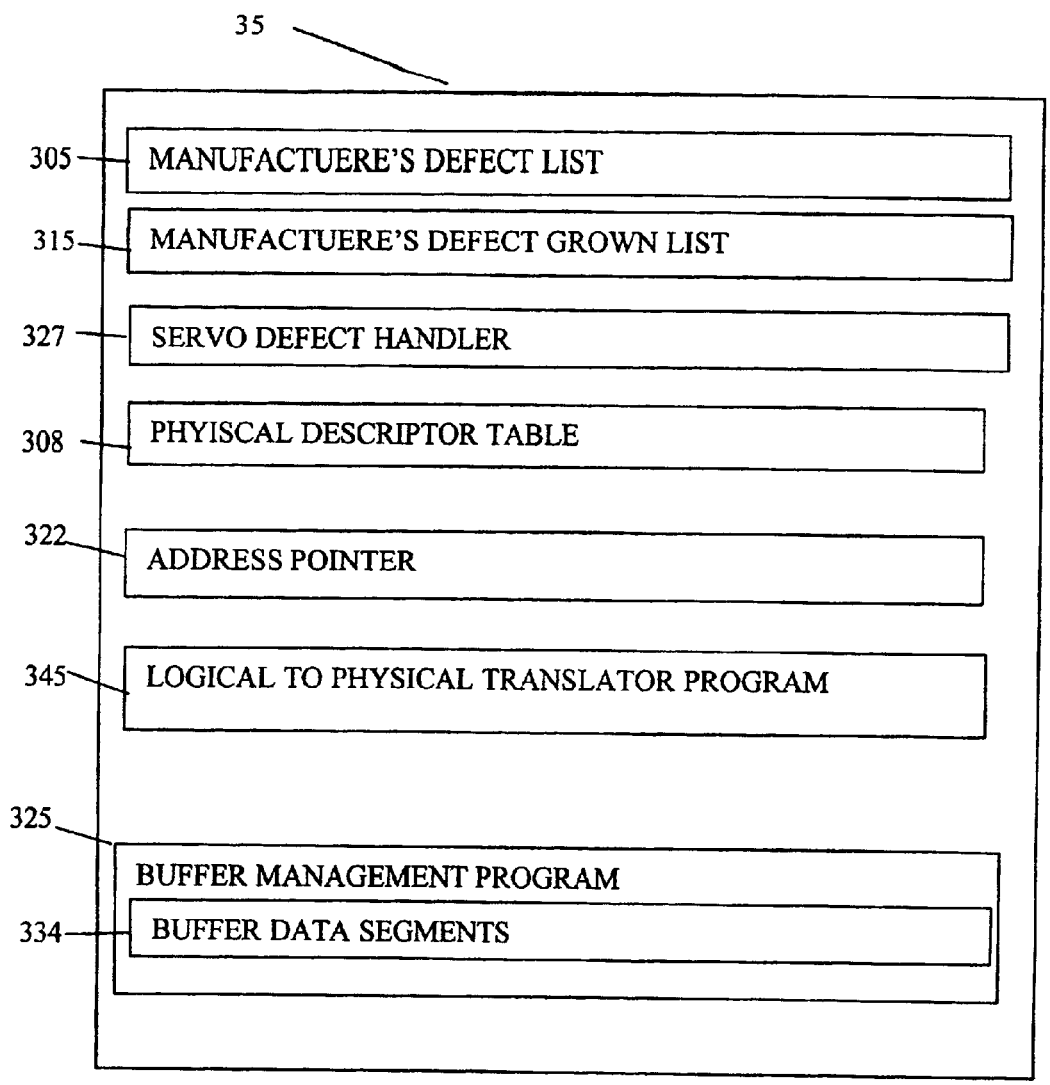
FIG. 3 illustrates a memory core for storing programming data in which aspects of the invention may be used to advantage.

FIG. 3 illustrates the code memory 35 for storing programming data in which aspects of the invention may be used to advantage. The code memory 35 is preferably random access memory sufficiently large to hold the necessary programming and data structures of the invention. The code memory 35 may be used to store operating code, and other run-time code that enables the drive. Additionally, the code memory 35 stores the data stream segments being written to and read from the media 50 to service applications for the host computer 80. For redundancy, the contents of the code memory 35 may also be stored to a plurality of reserved areas of the media 50 or into other areas of the drive electronics 30 such as buffer memory 32.

During manufacture, the recording media 50 is usually written to and then read back from to determine which PBAs are defective. As part of the process of converting a logical block address to a PBA on the media 50 two lists are stored in code memory 35, a manufacturer's defect list 305 and a physical descriptor table 308. The physical descriptor table 308 generally includes servo data that indicates how many bytes of data may be written between each servo wedge 220 and may indicate if the servo wedge 220 is to be skipped. The manufacture's defect list 305, i.e., drive defect list, maps the defect relationship between logical and physical addresses between the non-defective physical addresses and logical addresses, and is stored on the media 50 by the manufacture and loaded into the code memory 35 during operation. Additionally, as the media 50 is used, other defects may occur through, for example, the read/write head(s) 40 inadvertently touching the surface of the media 50 during a read and/or write operation and physically damaging a data sector 210 on the media 50. Media defects subsequent to the manufacturer's defect list 305 are placed in the manufacturer's defect grown list 315. Thus, the manufacturer's defect grown list 315 literally "grows" as the media 50 is used.

The code memory 35 further includes a logical to physical translation program 345 adapted to translate the LBA to the physical data location on the media 50 i.e., the PBA. The physical translation program 345 coordinates the translation of the logical address of a particular block of data to the physical address of the location at which the data is stored. The logical to physical translator program 345 uses the physical descriptor table 308, the manufacturer's defect list 305, and manufacturer's defect grown list 315 to determine if the requested sector(s) have moved due to defects during a read or write sequence. The code memory 35 also includes an address pointer 322 used to point the logical to physical translation program 345 to the physical descriptor table 408. The code memory 35 further includes a servo defect handler code 327 used to manage defective servo wedges 220. The data written after a defective servo wedge is generally unreliable. Therefore, the servo defect handler code 327 allows the disc drive to skip defective servo wedges 220 when needed.

The code memory 35 further includes a buffer management program 325. The buffer management program 325 is adapted to perform a method to optimize drive performance under varying system criteria, such as data stream file type, file size, seek times, cache usage, and the like. In one embodiment, code memory 35 includes a at least one read/write buffer data segment 334 having a read segment and a write segment used to store the data streams either received or sent to the host computer 80 for processing of applications such as AV files.

Data Rate-Based Buffer Segment Sizing

In one aspect, the buffer management program 325 determines and adjusts the size of the read/write buffer data segment(s) 334 for multiple streams of data to minimize the number of seeks given a total buffer area (TBA):

$$\text{SegmentSize} = x_i \qquad (1)$$

$$\text{SegmentSize}_{N-1} = TBA - \Sigma_{j=0}^{N-2}(\text{Segmentsize}_j) \qquad (2)$$

Where the values of $x_i$ are chosen to minimize the summations for data streams having data rates $R_j$:

$$\sum_{j=0}^{N-1} \cdot \left(\frac{x_i}{R_i}\right) \qquad (3)$$

For the case where there are only two streams $x_0$ and $x_1$ having data rates of $R_0$ and $R_1$ respectively, the number of seeks per unit time can be represented by:

$$\left(\frac{R_0}{x_0}\right) + \left(\frac{R_1}{x_1}\right) = \left(\frac{(R_0 - R_1) \cdot (x_0 - R_0) \cdot TBA}{x_0^2 - (TBA \cdot x_0)}\right) \qquad (4)$$

In addition, having a global minimum at the roots bounded by zero to about the TBA:

$$\left(\frac{R_0 \cdot TBA}{R_0 - R_1}\right) \cdot \left(1 \pm \sqrt{1 - \frac{(R_0 - R_1)}{R_0}}\right) \qquad (5)$$

Optimizing the seek times of the full system of N and $x_i$ for streams of more than two streams of data can be solved by finding the roots of the equation five for a $N-1^{th}$ degree polynomial using equation methods such as steepest decent, Newton, sequential regression, Weiner solution, and the like. In another aspect, the buffer management program 325 provides optimized segment estimation for a data stream relative to other data streams by modifying the above equations to provide a new estimate:

$$\left(\frac{R_0}{x_0}\right) + \left(\frac{\sum_{i=1}^{N-1} R_i}{TBA - x_0}\right) \qquad (7)$$

In order to further approximate the estimate calculation to within 5% of the optimum point for at least four data streams with data rates differing by at about 3 magnitudes and about 3% for four data streams differing by only about 1 order the roots of equation seven should be corrected by the following equations to correct for the gain bias where the gain bias is the is the ratio of the sum to the desired sum, i.e., the TBA:

$$y_i = \left( \frac{Ri \cdot TBA}{2 \cdot R_i - \sum_{j=0}^{N-1} R_i} \right) \cdot \left( 1 \pm \sqrt{1 - \frac{\left( (2 \cdot R_i) - \sum_{i=0}^{N-1} R_i \right)}{R_i}} \right) \quad (8)$$

Where:

$$x_i = \frac{y_i}{\sum_{i=0}^{N-1} y_i} \cdot tba \quad (9)$$

To negate the effects of the gain bias, the gain correction is applied to the sum of each $x_i$. Thus, by implementing the above equations, the buffer management program 325 can estimate the optimum segment size for each data stream to within 3% for at least four data streams differing by one order of magnitude, or by about 5% for at least four data streams differing by three orders of magnitude.

Method of Load Balancing

In another aspect, the buffer management program 325 manages the size of the read/write buffer segment(s) 334 by balancing the data stream loads. To balance the data stream loads the buffer management program 325 reexamines the current data stream load balance when the host computer 80 is writing data to the read/write buffer segment(s) 334 or when the disc is reading data from the media 50 that would overfill the read/write buffer segment(s) 334. In either case, the buffer management program 325 reexamines the current read/write buffer segment(s) 334 to determine if more or less read and/or write buffer space should be allocated to the segment(s) 334 being filled. The buffer management program 325 determines to add more or less buffer space using several methods including the equations above to estimate the buffer segment(s) size requirements based on data rates for the active data streams. Additionally, buffer management program 325 determines if there is space in other read/write buffer segment(s) 334 available such as when the host computer 80 finishes reading the data and decides that the data read is not needed for another future read access, or when the host computer 80 finishes writing the data and decides that the written information just written is not needed for future writes, or there is un-allocated read/write buffer segment(s) 334.

Data Time Stamping

In one aspect, the buffer management program 325 use data stamping to size the read/write buffer segments. Data stamping may be determined using several methods. For example, the host computer 80 can provide the size and the time requirements for the data streams and is usually closest to the time to start encoding or the end of the encoding or the time to transfer to the read/write buffer segment(s) 334. Other devices can also provide the time stamp data such as for A/V files an encoder e.g., an MPEG encoder adapted to send data rates to the buffer management program 325. Thus, the buffer management program 325 can use data from the host application or other devices such as encoders and decoders to establish the date rate and time requirements for each data stream command.

Although code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 4:
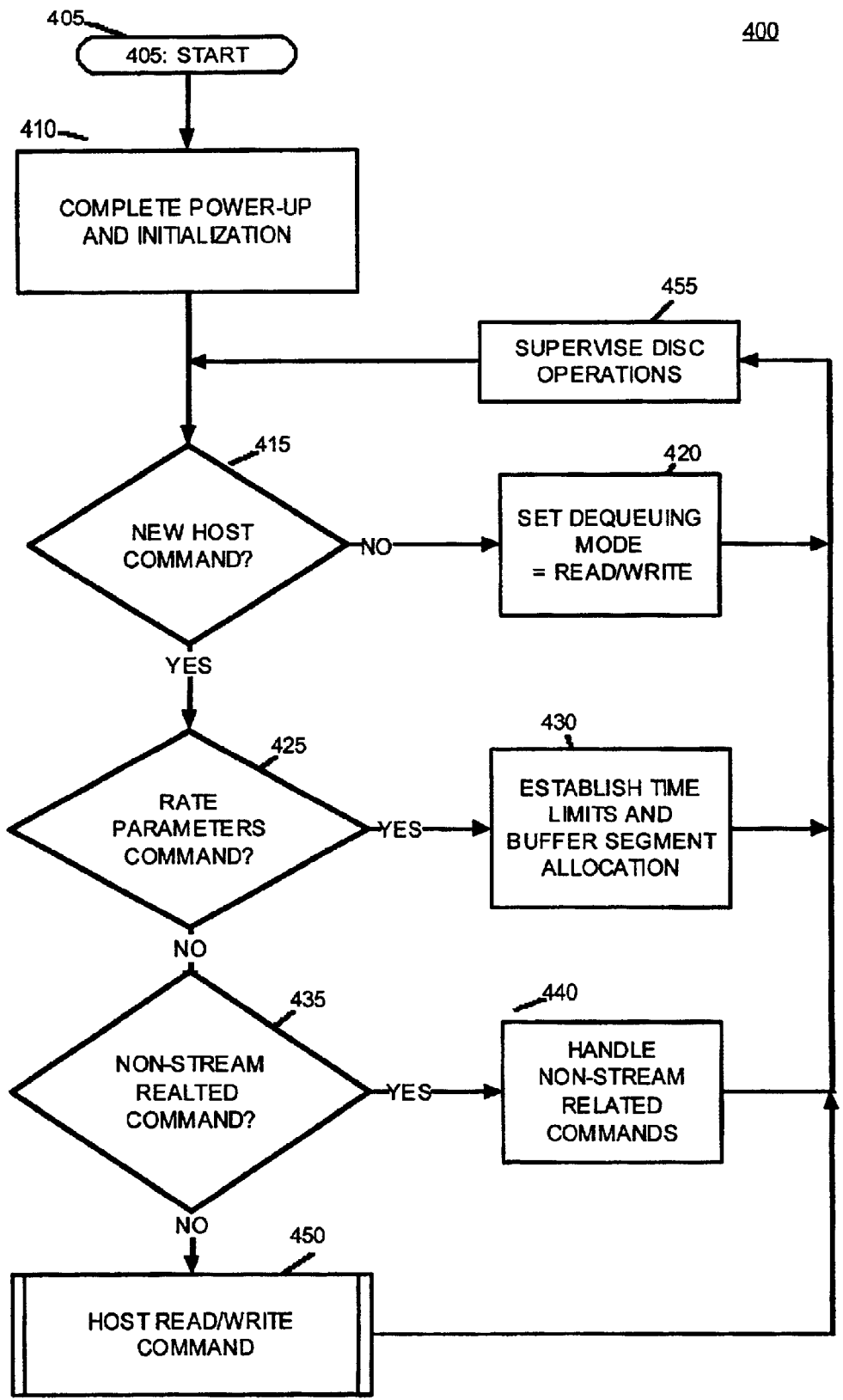
FIG. 4 is a flow diagram of a method for a start-up sequence for the disc-based apparatus of FIG. 1 in accordance with aspects of the invention.

FIG. 4 is a flow diagram of a method for a start-up sequence for the disc-based apparatus of FIG. 1 in accordance with aspects of the invention. As necessary, FIGS. 1–3 are referenced in the following discussion of FIG. 4.

FIG. 4 is entered at step 405 when for example the buffer management program 325 receives a command. At step 410, the interface/disc/servo controller 31 initializes the disc drive electronics 30, CPU 32, the code memory 35, the servo power 36, FETs 37, the read/write channel electronics 33, and the buffer memory 32 and begins the process of "spinning", i.e., rotating, the media 50 up to prepare the media 50 for a read or write operation. Additionally, at step 410, the method 400 determines whether the servomotor 41 is functioning properly. If the servomotor 41 is working improperly, the servomotor 41 spins down. If the servomotor 41 is functioning properly, the actuator arm 49 positions the read/write transducer head(s) 40 and reads the manufacturer's defect list 305 and physical descriptor table 408 stored within a reserved area within memory and/or on the media 50 such as a reserved area on a servo wedge 220. Further, at step 410, run-time code such as the address pointer 322, the servo defect handler 327, logical to physical translator program 345, and the like, are loaded into the code memory 35 from the media 50 and/or memory into a separate data location to allow the normal operation of the drive. The buffer management program 325 is loaded into code memory 35 from the media 50 and/or memory. The media 50 is checked if it is properly formatted to receive data from the read/write head(s) 40. Subsequently, method 400 then proceeds to step 415 to receive a command from the host computer 80. Conventionally, the disc drive handles host commands in a "queue" to allow the commands to be handled sequentially by "dequeuing" the commands either read, or write, or read/write. If the command received is a not a new host command, then the method 400 sets the dequeuing mode to read or write at step 420 and then supervises disc operations as known in the art at step 450. If the host command is new then method 400 proceeds to 425. At step 425, the method 400 determines if the command is to establish time limits, if the command is to establish time limits then the method 400 proceeds to step 430 to establish the read/write time limits for active data streams and the buffer allocation, then proceeds to step 450 to supervise disc operations as know in the art. In one aspect, method 400 determines the time limits and read/write buffer allocation for the data read or write using the equations one through eight above. In another aspect, the method 400 receives a command time limit from the host computer 80. If the host command is not a time limit command then method 400 proceeds to step 435 to determine if the host command is a non-data stream related command. If the host command is a non-data stream command such as a read or write command then the method proceeds to step to handle the command as known in the art and then proceeds to step 455 to supervise disc operations as known in the art. If the host command is a data stream command such as a read or write command then the method 400 processes the data stream command at step 450. Once processed, the method 400 returns to step 455 to supervise disc operations as known in the art. Subsequently, the method 400 proceeds to step 415 to determine the status of the next host command.

Figure 5:
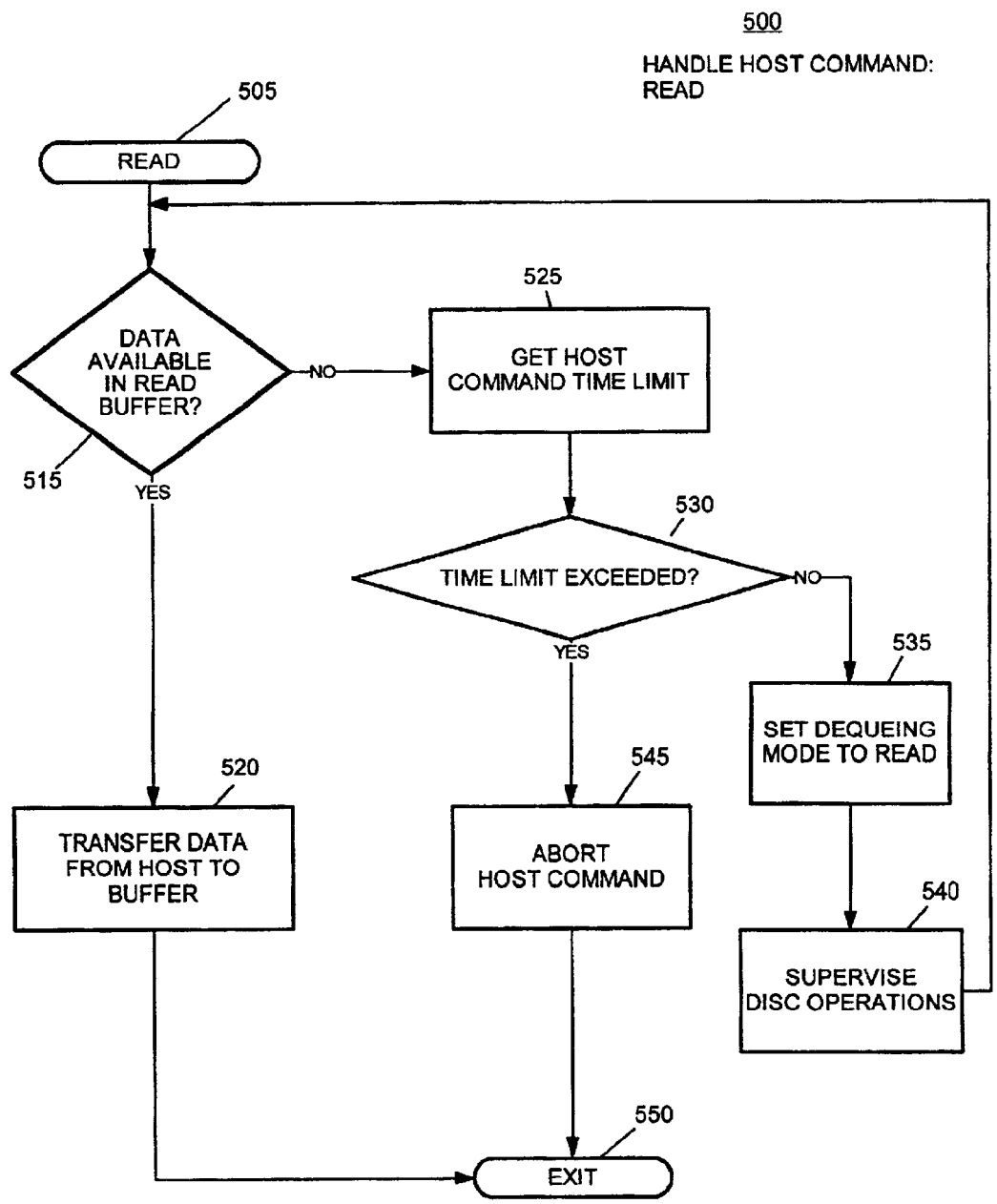
FIG. 5 is a flow diagram of a method for a read sequence for the disc-based apparatus of FIG. 1 in accordance with aspects of the invention.

FIG. 5 is a flow diagram of a method for a read sequence for the disc-based apparatus of FIG. 1 in accordance with aspects of the invention. As necessary, FIGS. 1–4 are referenced in the following discussion of FIG. 5.

FIG. 5 is entered at step 505 when for example the buffer management program 325 receives read command at step 450. At step 515, the method 500 determines whether data for the current data streams are in the read buffer segment of the read/write buffer segment(s) 334. If the there is data currently available in the read buffer segment(s) then the data is transferred in queue at step 520 from the host computer 80 to the read buffer for the next read requirement. Subsequently, the method 500 exits at step 550. If the data required is not in the read buffer segment then the method 500 obtains the read time limit from step 430. At step 530, if the time limit provided from step 525 is less than the current disc operation time then the method 500 aborts the command at step 545. If the time limit is greater than the current disc operation, then the method 500 proceeds to step 535 to set the dequeuing mode to read. At step 535, the method 500 supervises disc operations as known in the art and reads the data from the media 50 into the read/write buffer segment(s) 334 and then returns to step 515.

Figure 6:
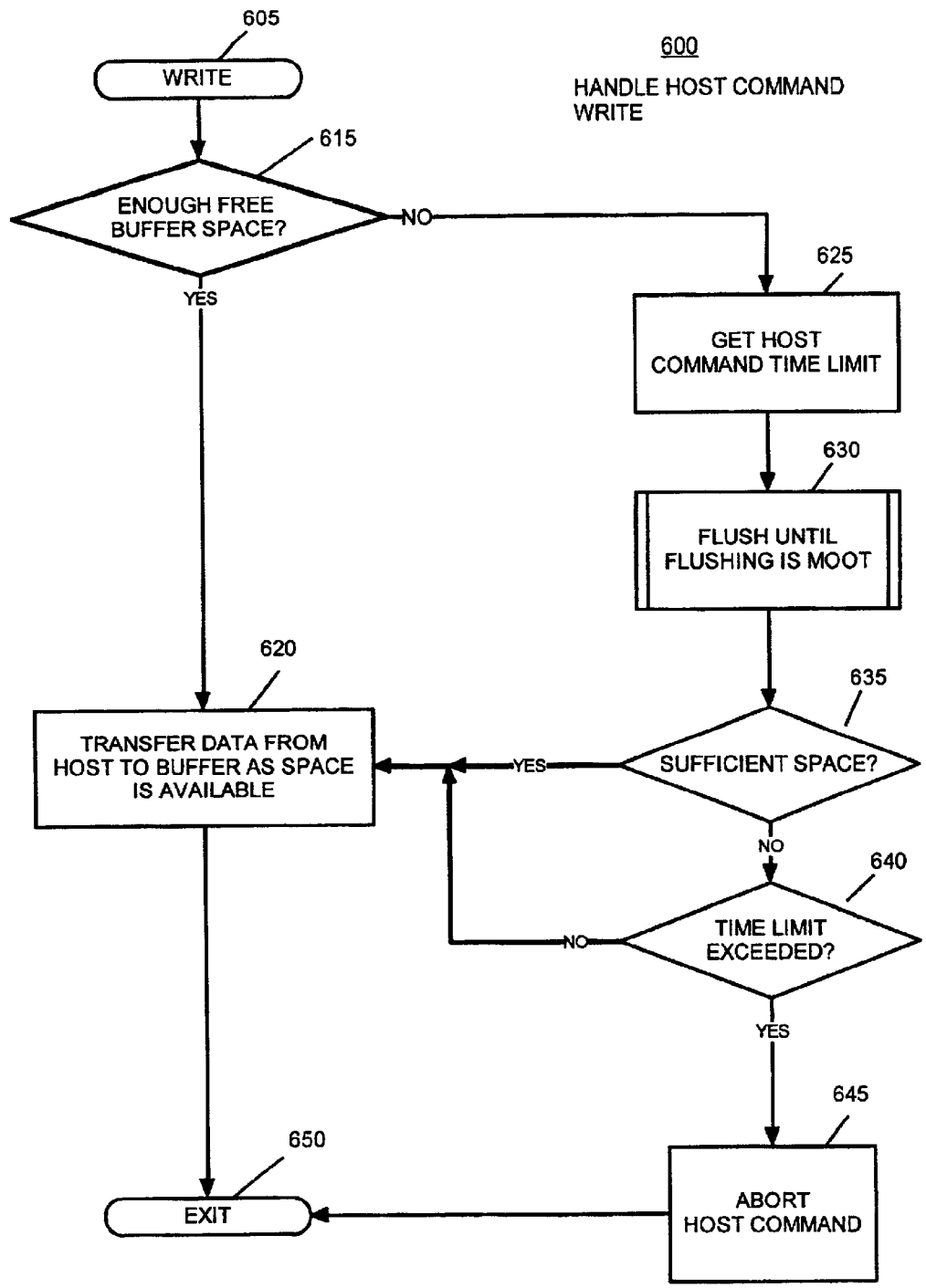
FIG. 6 is a flow diagram of a method for a write sequence for the disc-based apparatus of FIG. 1 in accordance with aspects of the invention.

FIG. 6 is a flow diagram of a method for a write sequence for the disc-based apparatus of FIG. 1 in accordance with aspects of the invention. As necessary, FIGS. 1–5 are referenced in the following discussion of FIG. 6.

FIG. 6 is entered at step 605 when for example the buffer management program 325 receives a write command at step 450. At step 615, method 600 determines if there is sufficient free write buffer space for the current write operation. In one aspect, method 600 determines if there is sufficient free write buffer space by comparing the current write buffer allocation to the write buffer space required to finish caching the current write data. If the read/write buffer segment(s) 334 have sufficient write buffer space, then the data is transferred from the host to the write buffer segment within read/write buffer 334. If there is insufficient space available, then the method 600 proceeds to step 625 to retrieve the host time limit for the write command. At step 630, the data is flushed as described in reference to FIG. 7 described below to free up the write buffer space. At step 635, the method 600 determines if the write buffer has sufficient space once it has been flushed from step 630. If there is a sufficient write buffer space then the method proceeds to step 620. If there is still an insufficient write buffer space, then at step 640 the host time limit from step 625 is compared to the time required for the current disc operation. If the time limit is longer than the disc operation, then the method 600 proceeds to step 620 to transfer the data. If the time limit is less than the current disc operation then the command is aborted and the host notified to wait at step 645. Upon the data transfer from step 620, or an abort command from step 645, the method 600 exits at step 650 to step 450.

Figure 7:
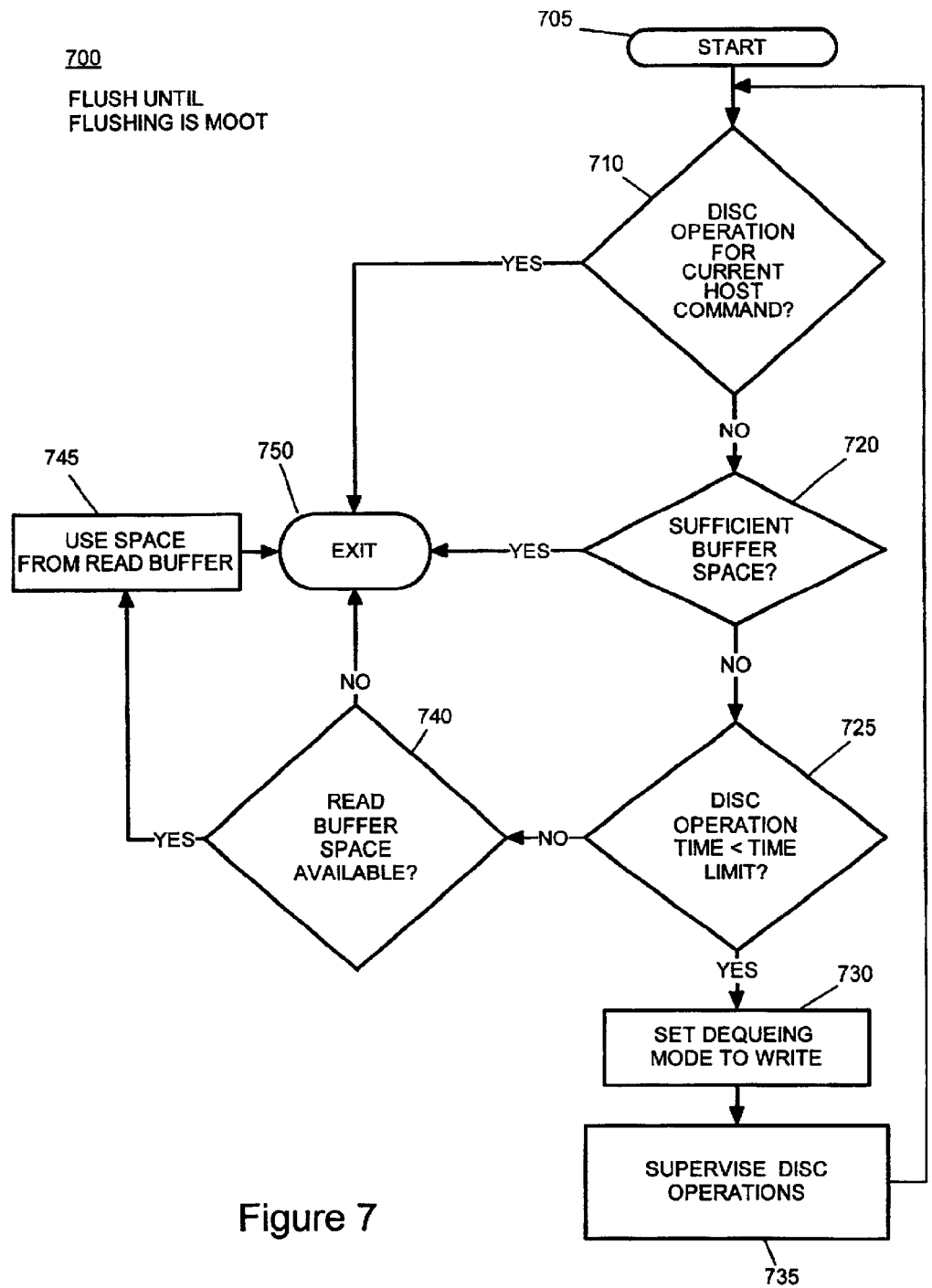
FIG. 7 is a flow diagram of a method for a data flushing sequence for the disc-based apparatus of FIG. 1 in accordance with aspects of the invention.

FIG. 7 is a flow diagram of a method for a data flushing sequence for the disc-based apparatus of FIG. 1 in accordance with aspects of the invention. As necessary, FIGS. 1–6 are referenced in the following discussion of FIG. 7.

FIG. 7 is entered at step 605 when for example the buffer management program 325 receives a flushing command at step 630. At step 710, the method 700 determines if the disc operation is for the current write host command. If the disc operation is not for the current host command then the method 700 exits at step 750. If the disc operation is for the current host command then method 700 proceeds to step 720 to determine if there is sufficient write buffer space to transfer the data from the host computer 80 to the read/write buffer segments 334. If there is a sufficient write buffer space, then the method 700 exits at step 750. If there is an insufficient write buffer space then method 700 proceeds to step 725 to compare the disc operation time limit to the time limit established from step 430. If the disc operation time limit is less than the established command time limit, then the method 700 proceds to step 740 to determine if there is sufficient read buffer space available. If there is not enough free read buffer space available, then the method 700 exits at step 750. If there is enough read buffer space available, then the read buffer space is used by the method 700 to store the write data from the host computer 80. If the disc operation time is greater than or equal to the write time limit then the dequeuing mode set to write to allow for the next write operation in the queue. At step 735, the method 700 supervises disk operations as known in the art, and then returns to step 710.

Although various embodiments which incorporate the teachings of the invention have been shown and described in detail herein, those skilled in the art can readily devise many other varied embodiments within the scope of the invention. For example, although segment size may be determined by data rates, the buffer management program 325 additionally may minimize the seek times by selecting a series of disc operations that minimize the servicing of the commands. Additionally, the time limits may be based on observation of the host activity. For example, the host may be storing and/or playing large A/V files. Based on the type of file the buffer management program 325 would examine the type of files being accessed and set the time limits accordingly for larger A/V files. Subsequently, if the host then changed to a pattern of smaller files then the buffer management program 325 would set the time limits for the smaller files.

In summary, aspects of the invention have particular advantages in electronic data storage systems. In one embodiment, the invention provides a method of buffer segment management on a disc drive which includes for a read operation 505, determining 515 if one or more buffer segments comprise the data for a read command, where if the data is available then processing 520 the data, where if the data is not available then determining 530 if a current disc operation time is greater than or equal to one or more read time limits to transfer the data from a media 50 to the one or more read buffer segments. If the disc operation time is greater than the one or more read time limits then aborting 545 the read command, but if the disc operation time is less than or equal to the one or more read time limits then reading 535,540 the data. For a write operation 605, determining 615 if the data storing size of one or more of the current write buffer segments is sufficient to store the data for the write command, If the data storing size is sufficient to store the data then transferring the data, however if the data storing size is not sufficient to store the data then, determining the data sizes of one or more write buffer segments minimizing the number of seek operations within one or more write time limits, where if transferring the data from the one or more write buffer segments is within the one or more write time limits then transferring the data; and wherein, if transferring the data from the one or more write buffer segments is not within the one or more write time limits then aborting 645 the write command.

In one aspect, determining if the current disc operation time is greater than the one or more read time limits includes determining 525 the one or more read time limits. Further, determining the one or more read time limits include determining 430 the minimum number of seeks with respect to one or more data transfer rates. In addition, determining 615 the data sizes of one or more write buffer segments minimizing the number of seek operations within one or more write time limits includes determining 625 the one or more write time limits. In another aspect, determining the one or more write time limits comprises determining 430 the minimum number of seeks with respect to one or more data transfer rates and associated write buffer segments where determining the minimum number of seeks with respect to one or more data transfer rates and associated write buffer segments comprises adjusting 430 the segment sizes with respect to the associated data rates wherein the summation of a plurality of ratios between the adjusted segment sizes and the respective data rates is indicative of the minimum number of seeks. In addition, for four or more data streams the number of seeks is within about 5 percent of the minimum number of seeks wherein the data streams are within about three orders of magnitude. In another aspect, for four or more data streams the number of seeks is within about 3 percent of the minimum number of seeks wherein the data streams rates are within about one order of magnitude. In another embodiment, In another embodiment, the invention provides a method of buffer segment management on a disc drive, for a read operation, establishing the command time limits 430 for reading at least two data streams into a read buffer segment, then determining 430 the data rates for at least two read data streams to establish 430 the time to read the data streams into the read buffer segment, determining 430 the read buffer segment size for each data stream with respect to each data stream data rate, comparing 530 the time required to read the at least two data streams into the read buffer segment with the time limits wherein if the time required to read the at least two data streams into the read buffer segment exceeds the command time limit then aborting 545 the read, however, if the time required to read the at least two data streams into the read buffer segment does not exceed the command time limit then reading 535, 540 the data.

For a write operation, determining 615 the data rates for at least two write data streams, then establishing 625 the time limits for transferring data from the write buffer to a media 50, where if the write buffer space is less than the size required then flushing 630 at least one write buffer segment to provided more write buffer segment space; where if after flushing 630 the write buffer segment the write buffer space is less than the size required then, determining 640 if the time limits will be exceeded; if the time limits will be exceeded then aborting 645 the write operation, however, if the time limits will not be exceeded then transferring 620 the data to the write buffer segments. In one aspect, determining 430 the data rates for at least two write data streams includes decoding 430 the data streams. Further, establishing 430 the time limits for transferring data from the write buffer to a media 50 includes determining 430 the command time limits. In addition, determining 430 the read buffer segment size for each data stream with respect to each data stream data rate includes determining 430 the minimum number of seeks for each data stream where after the step of determining 635 after flushing 630 the write buffer segment the space is less than the size required then determining 745 if a read buffer segment is available to store the write data; if the read buffer segment is available then transferring 745 the write data to the read buffer segment, and if the read buffer segment is not available then aborting 645 the write command.

In another embodiment, the invention provides a disc drive system including a signal-bearing media means 50 for storing data, a code memory 35 means coupled to a read/write controller means 33 for controlling the reading and writing of data to the signal-bearing media 50, means 40 for reading and writing the data to the signal-bearing media 50, a processor means 34 coupled to the code memory 35 and the read/write controller 33 including a program 325 for managing memory segments wherein the memory segments are sized based on data rate parameters. In one aspect, the program 325 when executed by the processor means 34 performs the steps of determining 515 if one or more buffer segments comprise the data for a read command, where, if the data is available then processing 520 the data. However, if the data is not available then determining 530 if a current disc operation time is greater than or equal to one or more read time limits to transfer the data from the media 50 to the one or more read buffer segments. Further, if the disc operation time is greater than the one or more read time limits then aborting 545 the read command, or if the disc operation time is less than or equal to the one or more read time limits then reading 535 the data.

For a write operation determining 615 if the data storing size of one or more of the current write buffer segments is sufficient to store the data for a write command, If the data storing size is sufficient to store the data then transferring 620 the data. If however, the data storing size is not sufficient to store the data then determining 430 the data sizes of one or more write buffer segments minimizing the number of seek operations within one or more write time limits, where, if transferring the data from the one or more write buffer segments is within the one or more write time limits then transferring 620 the data, and where, if transferring 620 the data from the one or more write buffer segments is not within the one or more write time limits then aborting 645 the write command.

In one aspect, determining 530 if the current disc operation time is greater than the one or more read time limits includes determining 430 the one or more read time limits, where determining 430 the one or more read time limits includes determining 430 the minimum number of seeks with respect to one or more data transfer rates. In another aspect, determining 615 the data sizes of one or more write buffer segments minimizing the number of seek operations within one or more write time limits includes determining 430 the one or more write time limits where determining 430 the one or more write time limits includes determining 430 the minimum number of seeks with respect to one or more data transfer rates and associated write buffer segments. In another aspect, determining 430 the minimum number of seeks with respect to one or more data transfer rates and associated write buffer segments comprises adjusting 430 the segment size with respect to the associated data rates wherein the summation of a plurality of ratios between the adjusted segment sizes and the respective data rates is indicative of the minimum number of seeks.

While foregoing is directed to embodiments of the invention, other and further embodiments of the invention may be devised without departing from the basic scope thereof, and the scope thereof is determined by the claims that follow.

What is claimed is:

1. A method of buffer segment management on a disc drive, comprising:
   wherein, for a read operation;
   determining if one or more buffer segments comprise the data for a read command;
   wherein, if the data is available then processing the data;
   wherein, if the data is not available then:
   determining if a current disc operation time is greater than or equal to one or more read time limits to transfer the data from a media to the one or more read buffer segments;
   if the disc operation time is greater than the one or more read time limits then aborting the read command;

if the disc operation time is less than or equal to the one or more read time limits then reading the data;

wherein, for a write operation;
   determining if the data storing size of one or more of the current write buffer segments is sufficient to store the data for a write command;
If the data storing size is sufficient to store the data then transferring the data;
If the data storing size is not sufficient to store the data then;
   determining the data sizes of one or more write buffer segments minimizing the number of seek operations within one or more write time limits;
wherein, if transferring the data from the one or more write buffer segments is within the one or more write time limits then transferring the data; and
wherein, if transferring the data from the one or more write buffer segments is not within the one or more write time limits then aborting the write command.

2. The method of claim 1, wherein determining if the current disc operation time is greater than the one or more read time limits comprises determining the one or more read time limits.

3. The method of claim 2, wherein determining the one or more read time limits comprises determining the minimum number of seeks with respect to one or more data transfer rates.

4. The method of claim 1, wherein determining the data sizes of one or more write buffer segments minimizing the number of seek operations within one or more write time limits comprises determining the one or more write time limits.

5. The method of claim 4, wherein determining the one or more write time limits comprises determining the minimum number of seeks with respect to one or more data transfer rates and associated write buffer segments.

6. The method of claim 5, wherein determining the minimum number of seeks with respect to one or more data transfer rates and associated write buffer segments comprises adjusting the segment sizes with respect to the associated data rates wherein the summation of a plurality of ratios between the adjusted segment sizes and the respective data rates is indicative of a minimum number of seeks.

7. The method of claim 5, wherein for four or more data streams the number of seeks is within about 5 percent of the minimum number of seeks wherein the data stream rates are within about three orders of magnitude.

8. The method of claim 5, wherein for four or more data streams the number of seeks is within about 3 percent of the minimum number of seeks wherein the data stream rates are within about one order of magnitude.

9. A method of buffer segment management on a disc drive, comprising:
   wherein, for a read operation;
      establishing the command time limits for reading at least two data streams into a read buffer segment;
      determining the data rates for at least two read data streams to establish the time to read the data streams into the read buffer segment;
      determining the read buffer segment size for each data stream with respect to each data stream data rate;
      comparing the time required to read the at least two data streams into the read buffer segment with the time limits wherein if the time required to read the at least two data streams into the read buffer segment exceeds the command time limit then aborting the read; wherein if the time required to read the at least two data streams into the read buffer segment does not exceed the command time limit then reading the data;

wherein for a write operation;
   determining the data rates for at least two write data streams;
   establishing the time limits for transferring data from the write buffer to a media;
   wherein if the write buffer space is less than the write buffer size required then flushing at least one write buffer segment to provide more write buffer segment space; wherein if after flushing the write buffer segment the space is less than the size required then;
   determining if the time limits will be exceeded; if the time limits will be exceeded then aborting the write operation; if the time limits will not be exceeded then transferring the data to the write buffer segments.

10. The method of claim 9, wherein determining the data rates for at least two write data streams comprises decoding the data streams.

11. The method of claim 9, wherein establishing the time limits for transferring data from the write buffer to a media comprises determining the command time limits.

12. The method of claim 9, wherein determining the read buffer segment size for each data stream with respect to each data stream data rate comprises determining the minimum number of seeks for each data stream.

13. The method of claim 9, wherein after the step of determining after flushing the write buffer segment the space is less than the size required then determining if the read buffer is available to store the write data; if the read buffer segment is available then transferring the write data to the read buffer segment, and if the read buffer segment is not available then aborting the write command.

14. A disc drive data storage system comprising:
   a signal-bearing media means for storing data;
   a code memory means coupled to a read/write controller means for controlling the reading and writing of data to the signal-bearing media,
   means for reading and writing the data to the signal-bearing media;
   a processor means coupled to the code memory and the read/write controller comprising a program for managing memory segments wherein the memory segments are sized based on data rate parameters;
   wherein the program when executed by the processor means performs the steps of:
   determining if one or more buffer segments comprise the data for a read command;
   wherein, if the data is available then processing the data;
   wherein, if the data is not available then:
   determining if a current disc operation time is greater than or about equal to one or more read time limits to transfer the data from a media to the one or more read buffer segments;
   if the disc operation time is greater than the one or more read time limits then aborting the read command;
   if the disc operation time is less than or about equal to the one or more read time limits then reading the data;
   wherein, for a write operation;
      determining if the data storing size of one or more of the current write buffer segments is sufficient to store the data for a write command;
   If the data storing size is sufficient to store the data then transferring the data;

If the data storing size is not sufficient to store the data then;

determining the data sizes of one or more write buffer segments minimizing the number of seek operations within one or more write time limits;

wherein, if transferring the data from the one or more write buffer segments is within the one or more write time limits then transferring the data; and wherein, if transferring the data from the one or more write buffer segments is not within the one or more write time limits then aborting the write command.

15. The method of claim 14, wherein determining if the current disc operation time is greater than the one or more read time limits comprises determining the one or more read time limits.

16. The method of claim 15, wherein determining the one or more read time limits comprises determining the minimum number of seeks with respect to one or more data transfer rates.

17. The method of claim 14, wherein determining the data sizes of one or more write buffer segments minimizing the number of seek operations within one or more write time limits comprises determining the one or more write time limits.

18. The method of claim 17, wherein determining the one or more write time limits comprises determining the minimum number of seeks with respect to one or more data transfer rates and associated write buffer segments.

19. The method of claim 18, wherein determining the minimum number of seeks with respect to one or more data transfer rates and associated write buffer segments comprises adjusting the segment size with respect to the associated data rates wherein the summation of a plurality of ratios between the adjusted segment sizes and the respective data rates is indicative of the minimum number of seeks.

* * * * *